United States Patent [19]

Dietrich, Sr.

[11] 4,131,323
[45] Dec. 26, 1978

[54] DUAL WHEEL ASSEMBLY FOR TRACTORS

[75] Inventor: William J. Dietrich, Sr., Congerville, Ill.

[73] Assignee: DMI, Inc., Goodfield, Ill.

[21] Appl. No.: 761,704

[22] Filed: Jan. 24, 1977

Related U.S. Application Data

[63] Continuation-in-part of Ser. No. 655,132, Feb. 4, 1976, abandoned.

[51] Int. Cl.$^2$ ............................................. B60B 11/00
[52] U.S. Cl. ................................. 301/36 R; 301/39 R
[58] Field of Search ............. 301/13 R, 13 SM, 36 R, 301/36 A, 36 WP, 38 R, 38 S, 39 R, 39 T, 39 C, 9 TV, 40 S; 85/50 C, 50 R; 285/417

[56] References Cited

U.S. PATENT DOCUMENTS

| | | | |
|---|---|---|---|
| 3,082,040 | 3/1963 | Degerness | 301/39 R |
| 3,337,270 | 8/1967 | Peterson | 301/39 R |
| 3,736,029 | 5/1973 | Dietrich | 301/39 R |

FOREIGN PATENT DOCUMENTS

| | | | |
|---|---|---|---|
| 565874 | 11/1958 | Canada | 285/417 |
| 1092487 | 4/1955 | France | 85/50 C |

*Primary Examiner*—Stanley H. Tollberg
*Assistant Examiner*—H. Grant Skaggs
*Attorney, Agent, or Firm*—Emrich, Root, O'Keefe & Lee

[57] ABSTRACT

A dual wheel attachment assembly for tractors has a number of brackets or lugs welded to the inner surface of the dual wheel. The primary tractor wheel is provided with eye-nuts for receiving bolt fasteners used to connect the brackets of the dual wheel. The spacing of brackets on the dual wheel rim is different than the spacing of attaching locations on the tractor wheel so that the bolt fasteners are angularly offset relative to a line parallel to the axis of the axle. Members are included to permit such angular offset of the bolt fasteners relative to the brackets by providing a first surface curved about a radial line passing through the axis of the drive shaft so that the bolt fastener may be angularly adjusted over a continuous range in aligning it between the bracket and the desired attaching location on the tractor wheel. A second curved surface permits each fastener to adjust in a radial direction to accommodate to wheels having eye-nuts placed at different spacings.

5 Claims, 18 Drawing Figures

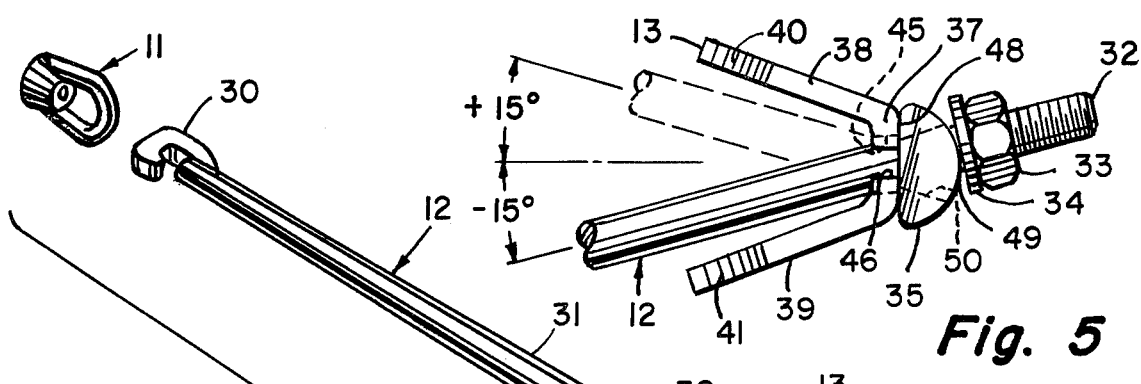
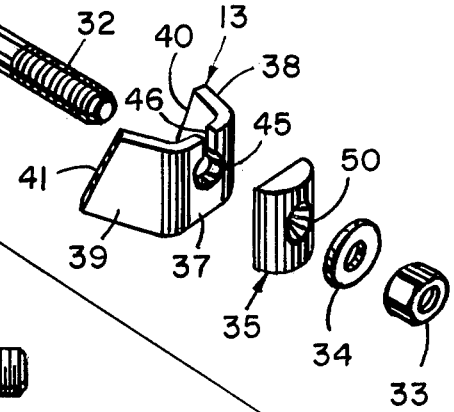
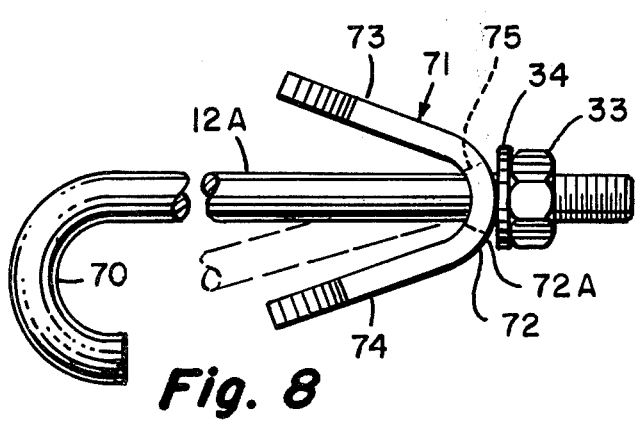
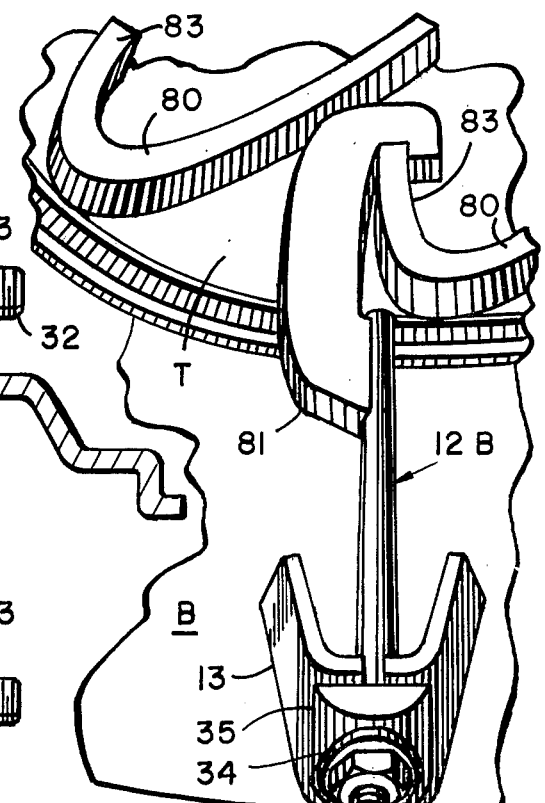

DUAL WHEEL ASSEMBLY FOR TRACTORS

RELATED APPLICATION

This is a continuation-in-part application of my co-pending application Ser. No. 655,132, filed Feb. 4, 1976 now abandoned.

BACKGROUND AND SUMMARY

1. Field of the Invention

The present invention relates to an assembly for securing an additional wheel (called a "dual" or "auxiliary" wheel) to the existing drive wheel of a tractor (called the "primary" wheel or, simply the "tractor wheel") in order to provide additional traction.

Dual wheel assemblies for agricultural tractors are common, and they may be classified, in general, into rim-mounted dual wheels or axle-mounted dual wheels. The present invention relates to a rim-mounted dual wheel wherein the rim of the dual wheel is mounted to the tractor wheel by means of bolt fasteners.

2. Known Constructions

In earlier dual wheel assemblies, individual brackets were welded on the rim of the dual wheel, and studs on the primary wheel were provided with eye-nuts. A long, hooked bolt fastener was then used to connect the eye-nuts to the brackets on the rim of the dual wheel, thereby securing the dual wheel to the primary tractor wheel.

Because of the weight of the dual wheel and the need to align the brackets on the dual rim with the eye-nuts on the tractor wheel, systems were devised, such as that disclosed in the Peterson U.S. Pat. Nos. 3,337,270, and my patent 3,736,029, which employ a track or rail extending about the interior of the rim of the dual wheel. In this type of construction, a movable bracket may be placed along the rim and located adjacent an eye-nut for fastening without having to align the rim of the dual wheel with that of the tractor wheel. Further, in my U.S. Pat. No. 3,736,029, there is disclosed a system for offset alignment of the bolt fasteners. The term "offset alignment" means that some of the bolt fasteners are connected to the dual wheel rim at a position located clockwise relative to their associated eye-nuts, while others are connected at locations displaced counterclockwise from their associated eye-nuts. This has the advantage that at least some of the bolts are always under tension whether the tractor is moving in a forward direction or in reverse.

Modern tractors have gone to engines of higher and higher horsepower, and the force necessary to secure a dual wheel to a tractor wheel has correspondingly increased. One of the problems with a rail-type dual wheel is that failures occur at the location where the rail is welded to the rim, due to the larger forces required to fasten the two together and the extreme conditions of use. This problem is aggravated with tractors of greater horsepower.

Further, it has been suggested by illustration in U.S. Pat. No. 3,836,202 that the fasteners might be aligned radially of the axis of the drive shaft in a rim-type of dual wheel system. This is useful in accommodating a single dual wheel to drive wheels having different spacings of eye-nuts.

SUMMARY OF THE INVENTION

The present invention employs a number of brackets which are welded to the inner surface of the dual wheel rim. The brackets are spaced at different intervals than the eye-nuts. There may be more or less brackets than eye-nuts. For example, as will be seen, there may be 14 brackets and 8 eye-nuts, or there may be 6 brackets and 16 eye-nuts. In the former case, 8 fasteners would be used; and in the latter case, 6 fasteners would be used. In one embodiment there are a different number of brackets than eye-nute being used for fasteners. The eye-nuts are spaced about the axis [i.e., the axis of the drive shaft] at one angular spacing, and the eye-nuts are spaced at a different spacing. Thus, some of the brackets will be angularly offset in a clockwise direction, and some in a counterclockwise direction relative to their associated eye nuts. Hence, some of the fasteners will always be in tension whether the tractor is going forward or in reverse. Thus, the present invention includes means in a discrete-bracket, rim-connecting dual wheel assembly defining a first curved surface to permit angular offset of the bolt fasteners. A second curved surface permits the adjustment of the bolt in a direction radial of the axis of the drive shaft.

An alternative embodiment is disclosed wherein the fastener attaches, not to eye-nuts on the tractor wheel, but directly to the power-adjust rails on the rim of a power-adjust tractor wheel.

In a preferred embodiment permitting universal adjustment of the fastener bolt (i.e., independent adjustment along orthogonal axes), the brackets on the dual wheel rim form a bearing wall braced by two arms welded to the rim. The bearing wall defines an elongated aperture for receiving a bolt fastener, and a slot extending upwardly in the bearing wall from the aperture for receiving a bolt fastener in assembling or removing the fastener. Further, an adjusting assembly is provided.

The adjusting assembly includes two members adapted to be coupled together to prevent relative rotation. Each member has a D-shaped cross section, and it includes a tapered aperture extending through it transverse of the D-shape for receiving a fastener bolt. The backs of the adjusting members are flat, according to the D-shape, and the members are arranged in back-to-back relation. The curved bearing surface of one adjusting member provides a continuous adjustment range so that the bolt fastener may assume any number of positions for aligning with an associated attaching location on the tractor wheels. The curved surface of the other adjusting member provides a similar range for radial adjustment of the fastener bolt to accommodate it to different placements of eye-nuts.

Other features and advantages will be apparent to persons skilled in the art from the following detailed description of a preferred embodiment accompanied by the attached drawing wherein identical reference numerals will refer to like parts in the various views.

THE DRAWING

FIG. 4 is a perspective view of a first embodiment of an attaching assembly incorporating the present invention with the parts in exploded relation;

FIG. 5 is a fragmentary close-up plan view of the bracket and adjusting member of FIG. 4;

FIGS. 6 and 7 are top and side fragmentary views of a second embodiment showing a bracket and adjustment member according to the present invention;

FIG. 8 is a top view of a third embodiment of the invention, with the fastener bolt cut away in the middle and foreshortened;

FIG. 9 is a fragmentary perspective view of still another embodiment of the invention adapted for use with power-adjust tractor wheels;

DETAILED DESCRIPTION

Figure 1:
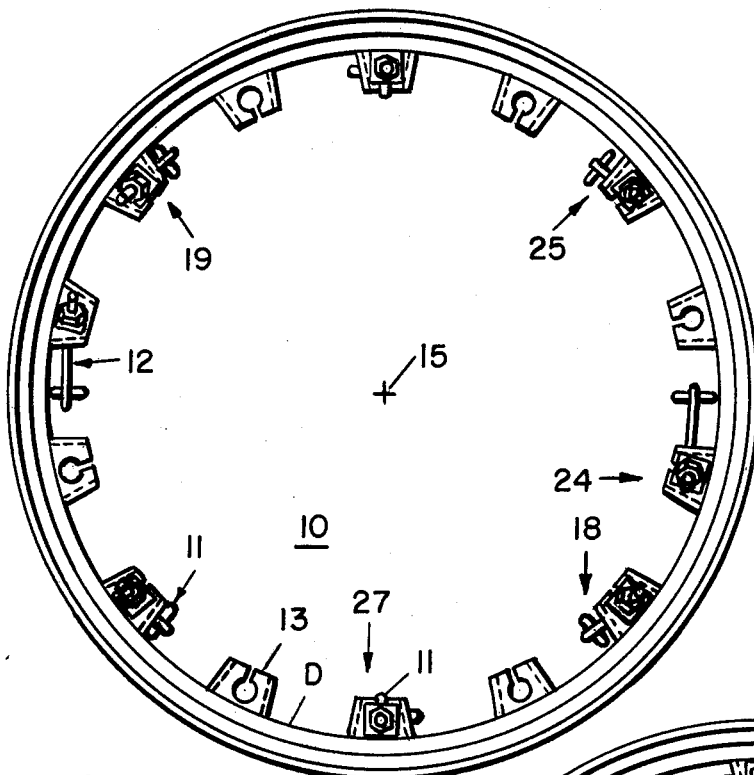
FIG. 1 is a side view of a dual wheel rim incorporating the present invention.

In the drawing, T represents a tractor wheel rim; and the rim of an associated dual wheel is designated D. The two rims are separated by a spacer band B, see, for example, FIG. 3. The spacer band B extends completely around the periphery of the rims T and D.

Figure 2:
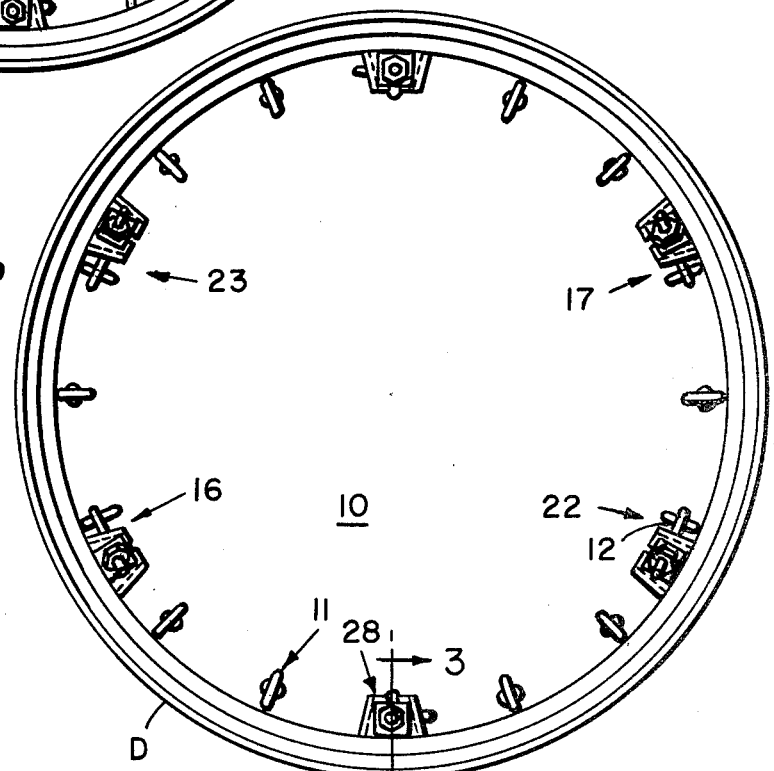
FIG. 2 is a side view similar to FIG. 1 showing a different number of lugs and attaching locations.
Figure 3:
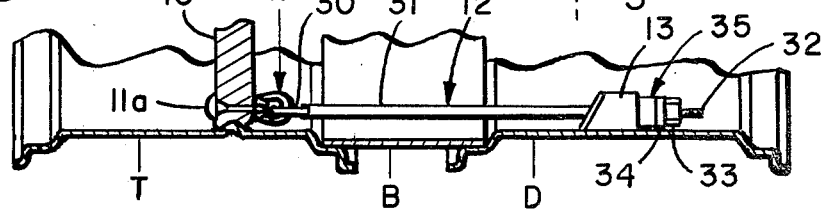
FIG. 3 is a fragmentary transverse sectional view taken through the section line 3—3 of FIG. 2.

Referring first to FIGS. 2 and 3, the tractor rim T includes a spider section 10. A number of eye-nuts, designated 11, are spaced evenly about the spider 10, adjacent the rim T. The eye-nuts 11 extend laterally outward of the spider 10 and receive a fastener generally designated 12, the other end of which is connected to a bracket or lug 13 secured to the inner surface of the dual rim D.

Comparing FIGS. 1 and 2, in FIG. 1, there are eight of the eye-nuts 11 spaced at 45° intervals about the spider 10, and there are fourteen brackets 13. Eight of the fasteners 12 are used to secure the dual wheel rim D—one fastener for each eye-nut. In FIG. 2, on the other hand, there are sixteen eye-nuts and six brackets both of which are spaced at equal angular intervals about the peripheries of the spider and dual rim respectively, although this equal spacing is not necessary to practice the invention.

Still referring to FIGS. 1 and 2, it will be observed that by having an unequal number of brackets and eye-nuts, and by spacing each equally about the axis of the axls (diagrammatically represented at 15 in FIG. 1), at least some of the eye-nuts will be displaced clockwise relative to their associated brackets (see the relationship at 16 and 17 in FIG. 2 and at 18 and 19 in FIG. 1), while other eye-nuts will be displaced counterclockwise relative to their associated brackets (see the relationships at 22 and 23 of FIGS. 2 and 24 and 25 of FIG. 1). Thus, whether the tractor is going in forward or reverse direction, some of the fasteners will always be in tension; and this is referred to as "offset alignment". As seen in the illustrations of FIGS. 1 and 2, some of the eye-nuts may be aligned with their associated brackets, such as those designated 27 and 28 respectively. This does not diminish the effect of offset alignment, as just explained.

Figure 15:
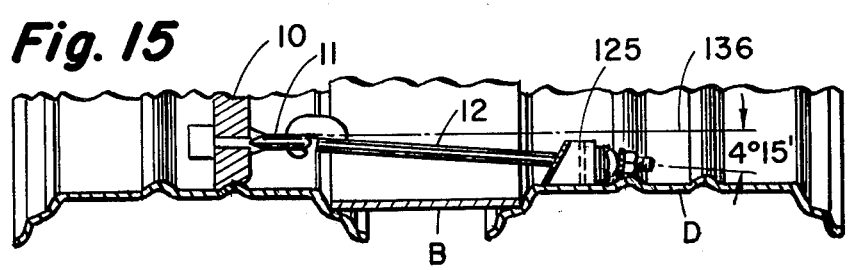
FIG. 15 is a side view of the embodiment of FIG. 14.

To be distinguished from offset alignment (in which the axis of the bolt fastener is moved laterally to form an acute included angle with a line parallel to the axis of the axle passing through the bracket) is the concept of radial alignment (in which the axis of the bolt fastener is inclined radially of the axis of the axle). The former provides that some bolt fasteners will be in tension when the vehicle is in forward drive, and others will be in tension when the vehicle is in reverse drive. This concept is illustrated in FIGS. 1, 2, 5, 6, 8, 14 and 16. The latter concept permits the axis of the bolt fastener to be inclined radially inward so as to accommodate wheels having different spacing for the eye-nuts. This concept is illustrated in FIG. 15.

Returning now to FIGS. 3 and 4, the elements of one assembly for attaching a dual wheel rim to a tractor wheel rim will be explained in more detail. The bolt fastener 12 is provided at one end with a hook element 30 which is received in the opening of the eye nut 11 and fastens to it when the bolt fastener is tightened. The hook 30 is attached to an elongated shaft 31, the other end of which is threaded as at 32. The fastener 12 is tensioned to the bracket by means of a nut 33. A washer 34 and an adjusting member 35 are interposed between the nut 33 and the bracket 13.

Referring particularly to FIGS. 4 and 5, the bracket 13 includes a bearing wall 37 and two outwardly extending support walls or braces 38, 39, the distal ends of which may be tapered as at 40, 41 respectively. The bearing wall 37 is provided with a central aperture 45 for receiving the bolt 32; and a slot 46 extends upwardly from the aperture 45 to permit passage of the hook member 30 in removing or inserting the bolt fastener 12. The brackets 13 are preferably welded at desired spacing to the inner surface of the dual rim D along the bottom edges of the bearing wall 37 and the support walls 38, 39.

The adjusting member 35 has a D shape in transverse section. Thus, it includes a generally flat bearing surface 48 and a cylindrical wall or bearing surface 49.

Extending transversely through the adjusting member 35 is an aperture 50 of frusto-conical shape—that is, it has an increasing diameter proceeding from the flat wall 48 to the curved or cylindrical wall 49. The shaft 31 of the bolt fastener 12 is received in the aperture 50, and the frusto-conical shape of the aperture 50 permits angular adjustment of the fastener. In the illustrated embodiment, the axis of the shaft 31 may be adjusted in offset alignment by ± 15° relative to true alignment (that is, when the axis of the shaft 31 is parallel to the axis of the axle of the vehicle). The washer 34 bears against the cylindrical wall 49 of the adjusting member 35, and the nut 33 is tightened onto the threaded portion 32 to secure the dual rim to the primary tractor wheel, with the intermediate spacer band B under compression between the two.

Turning now to the embodiment of FIGS. 6 and 7, the fastener 12 is similar to that just described, as are the nut 33 and washer 34. Further, a bracket 60 may be generally similar to the previously described bracket 13 except that the bearing wall 61 is curved to provide a generally concave bearing surface 62. In this case, the adjusting member is designated 65, and again, it has a generally D-shaped transverse section; however, its position is reversed. That is, the adjusting member has a flat surface 66 and a curved surface 67. The curvature of the surface 67 is the same as the curvature of the concave surface 62 of the bracket 60. The adjusting member 65 includes a central aperture 68 which, in this embodiment, need not be tapered because the adjusting member itself is turned as the fastener 12 is adjusted.

Turning now to the embodiment of FIG. 8, the fastener is designated 12A, and it is a J-bolt, including a hooked portion 70 which is received in the opening of an eye-nut of the type described above. In this embodiment, the bracket is designated 71, and it includes a curved bearing wall 72, and first and second support walls 73, 74 which, again, open outwardly and extend toward the tractor wheel. An aperture 75 is formed in the bearing wall 72 for receiving the fastener 12A, which, again, is secured by means of a nut 33 and fastener 34.

It will be observed that in the embodiment of FIG. 8, there is no need to provide a slot in the bracket 71 because the J-bolt 12A may be removed through the aperture 75. Further, in this embodiment, there is no need for a separate adjusting member because the bearing wall 72 defines a curved bearing surface 72A which permits angular adjustment of the shaft of the fastener 12A.

Turning now to the embodiment of FIG. 9, the elements are similar to those disclosed in connection with the embodiment of FIGS. 4 and 5, except the assembly is modified to accommodate a power-adjust tractor wheel. In a power-adjust tractor wheel, power-adjust rails 80 are welded to the interior surface of the tractor rim T; and they comprise the attaching locations on the primary tractor rim. In this embodiment, the fastener is designated 12B, and it includes a C-shaped hook member 81 which is dimensioned to be received on the inwardly-extending portion 83 of the rail 80. A bracket 13 and an adjusting member 35 (similar to the ones shown in FIG. 4) are also employed.

Figure 10:
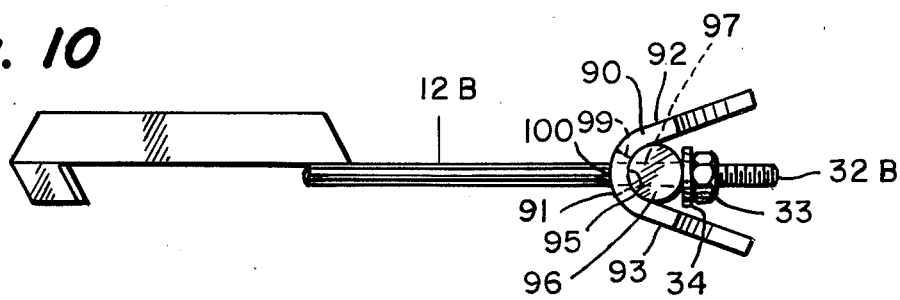
FIGS. 10 and 11 are top and side views respectively of the attaching assembly for the dual wheel structure of FIG. 9.
Figure 11:
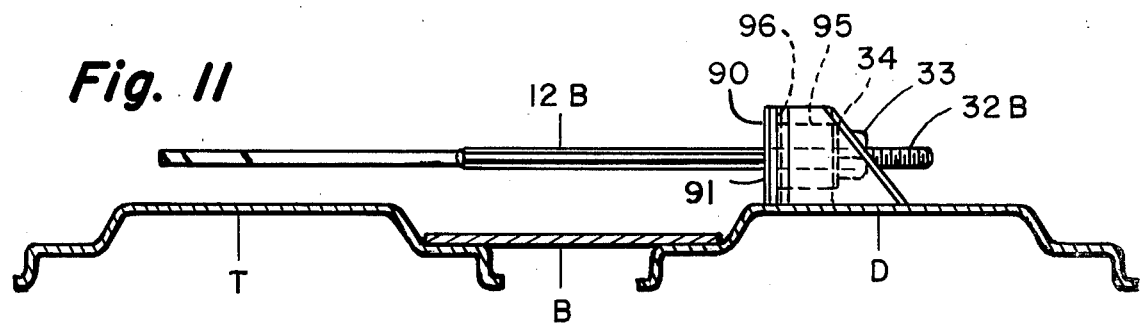

Referring now to FIGS. 10 and 11, there is shown another embodiment of the invention adapted to accommodate tractor rims with power-adjust rails, although the rails are not shown in FIG. 11. The fastener of this embodiment is similar to that designated 12B in FIG. 9.

The bracket is designated by reference numeral 90, and it again includes a curved bearing wall 91 with outwardly extending support walls 92, 93 which, in this embodiment, extend away from the tractor rim. The curved bearing wall 91 defines a concave bearing surface 95 to which is fitted an adjusting member 96 having a circular transverse section, and defining an aperture 97 of generally uniform diameter which receives the shaft of the fastener bolt 12B. A nut 33 and washer 34 are received over the shaft of the bolt fastener 12B for tensioning the fastener against the curved rear surface of the adjusting member 96. A slightly tapered aperture 99 is provided in the curved bearing wall 91 for receiving the shaft of the fastener 12B, and a slot 100 extends upwardly from the aperture 99 to facilitate removal of the bolt fastener 12B, when it is desired.

Figure 12:
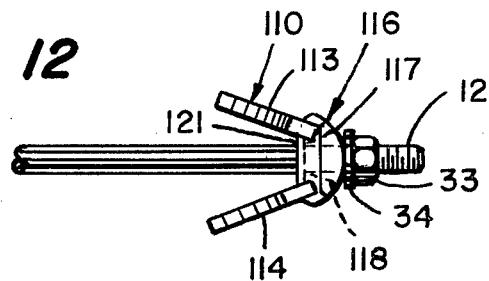
FIGS. 12 and 13 are top and side fragmentary close-up views of still another embodiment of the invention.
Figure 13:
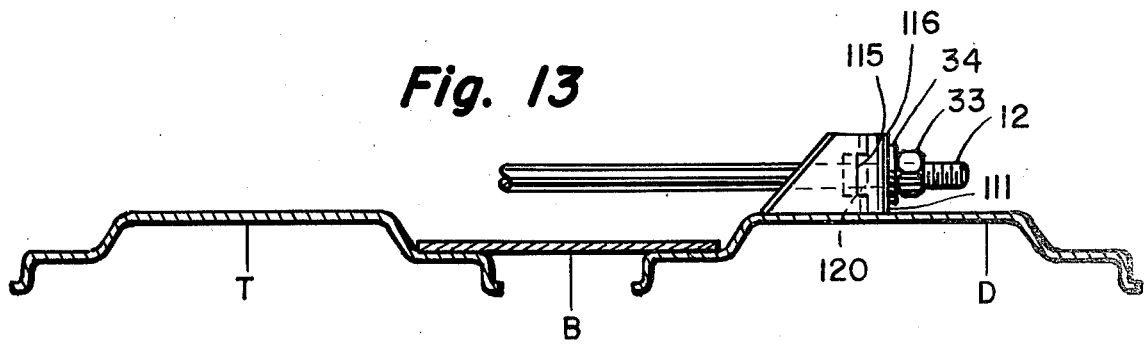
Figure 14:
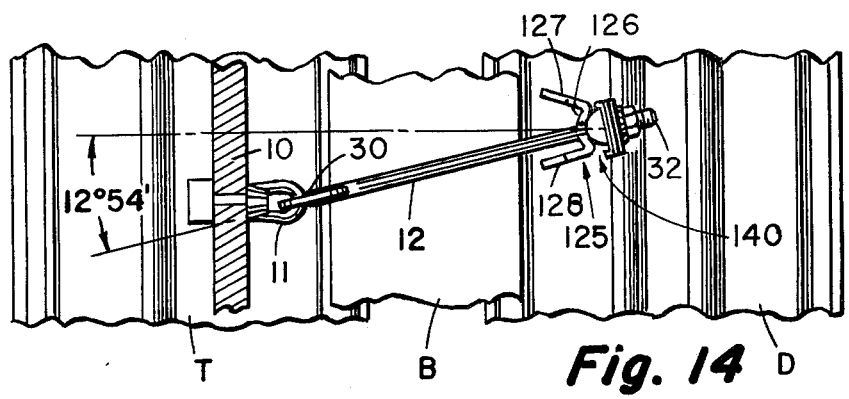
FIG. 14 is a plan view of another embodiment of the invention.

Another embodiment of the invention is shown in FIGS. 12 and 13. In this embodiment the bolt fastener may be any of the three types disclosed above, depending upon the type of tractor wheel to which it is desired to attach a dual wheel. Here, the bracket is designated 110, and it includes a bearing wall 111 and first and second support walls 113, 114 which extend outwardly and toward the tractor rim. The bearing wall is notched as at 115 to receive an adjusting member 116. The adjusting member 116 defines a curved bearing surface 117 against which a washer 34 is urged by a nut 33. Again, the adjusting member 116 includes a tapered aperture 118 which receives the fastener 12. Further, the adjusting member 116 includes a projecting portion 120 which is received in the notch 115 of the bracket.

The notched portion 115 of the bracket is dimensioned to receive a boss designated 121 on the adjusting member 116.

Turning now to the embodiment of FIGS. 14–18, eye-nuts are again designated 11, and the bolt fastener may be identical to the previously described bolt fastener 30 which is provided at one end with a hook 30, and at the other end with threads 32.

Figures 16, 17:
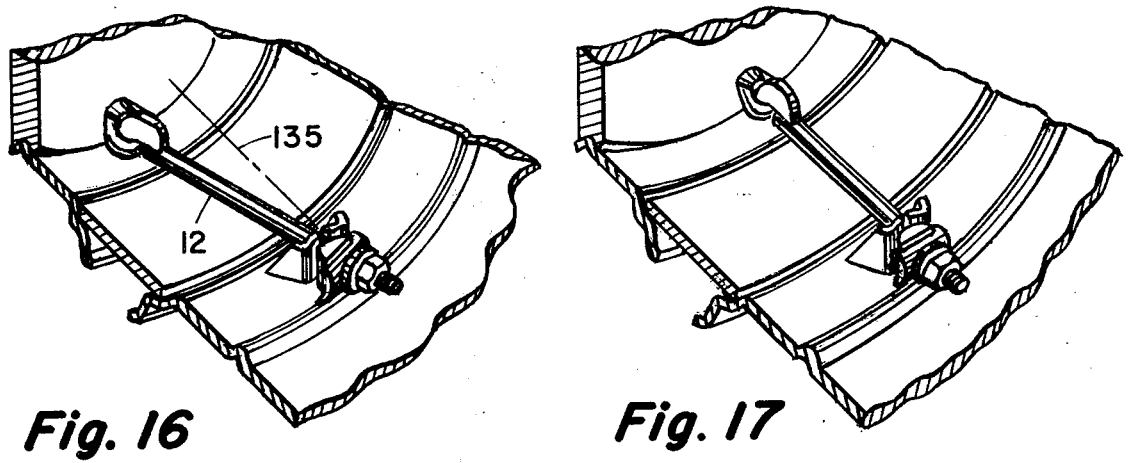
FIG. 16 is a perspective view of the embodiment of FIG. 14 showing offset alignment.
FIG. 17 is a view similar to FIG. 16 but with the fastener aligned with the axis of the axle.

A bracket is designated 125, and it includes a curved center wall 126 and first and second bracing side walls 127, 128 which extend from center wall toward the tractor wheel T. The center wall 126 of the bracket 125 defines a concave bearing surface, best seen in FIGS. 14 and 18, and it defines a slot of generally inverted T shape. The base of the T shape is designated 130, and the transverse portion is designated 131. The base slot 130 permits assembly of the bolt fastener 12 by passing the hook 30, and the transverse slotted portion 131 permits adjustment of the bolt fastener to achieve offset alignment, as illustrated in FIG. 16 wherein reference numeral 135 diagrammatically illustrates a line parallel to the axis of the axle and passing through the bracket 125. It will be observed that in this illustration the bolt fastener is inclined to lead (in the direction of rotation) the line 135.

Radial alignment of the bolt fastener 12 for this embodiment is illustrated in FIG. 15, and it will be observed that a radial alignment as much as 4° 15' can be achieved between the axis of the bolt fastener 12 and a line designated 136 which is parallel to the axis of the drive axle.

In order to accomplish both the offset alignment and the radial alignment, an adjusting assembly generally designated 140 is provided, and it is secured on the bolt by means of a washer 34 and nut 33, as previously described.

Figure 18:
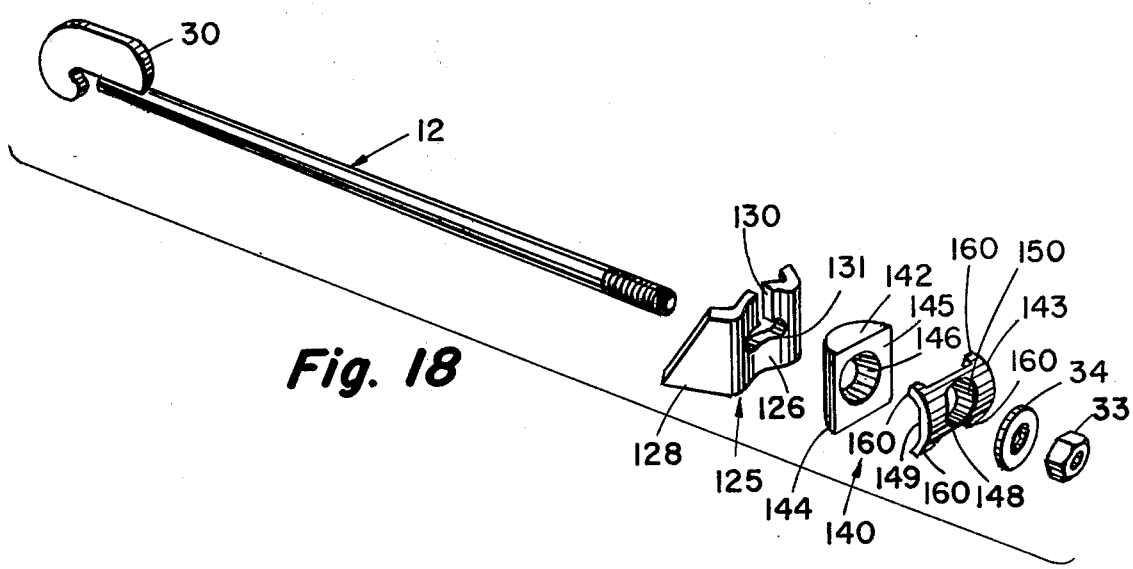
FIG. 18 is an exploded perspective view of the embodiment of FIG. 14.

Referring now particularly to FIG. 18, the adjusting assembly 140 includes a first D-shaped member 142 and a second, similarly shaped member 143. The adjusting member 142 includes a curved bearing surface 144 adapted to engage the concave bearing surface of the curved center wall 126 of the bracket 125, a flat rear wall 145, and a tapered aperture 146 adapted to receive the bolt 12 loosely. The aperture 146 may be tapered to have a wider cross sectional area adjacent the flat wall 145 to permit radial alignment of the bolt (offset alignment being accommodated by positioning of the adjusting member 142).

The second adjusting member 143 also includes a curved bearing surface 148, a flat wall 149 adapted to engage the flat wall 145 of the first adjusting member, and a tapered aperture 150. The aperture 150 may be tapered to accommodate the bolt fastener 12 in offset alignment (radial alignment being accommodated by the curved surface 143). The adjusting member 143 includes four dogs or ears 160 which are spaced so as to extend laterally of the first adjusting member 142 when the wall 145 of adjusting member 142 is brought into contact with the wall 149 of the second adjusting member 143. The dogs 160 comprise coupling means which prevent relative rotation between the two adjusting members 142, 143, as illustrated in FIGS. 16 and 17.

In operation of the embodiment of FIGS. 14–18, the bolt fastener is first assembled by passing the hook 30 through the base slot 130 in the bracket 125. Next, the individual adjusting members 142, 143 of the adjusting assembly 140 are passed over the bolt 12 if they are not already assembled to it, until the curved bearing surface 144 of the member 142 engages the concave surface of the center wall 126 of the bracket 125. As explained above, the adjusting member 142 accommodates offset alignment of the bolt fastener, and the adjusting member 143 accommodates radial alignment depending upon the location of the eye-nuts. The two adjusting members are coupled together by means of the dogs 160 in the sense that they cannot be rotated relative to each other once the washer and nut are applied to the bolt fastener 12.

With the present invention, the brackets may be welded to the dual rim either near the inner edge, as shown in FIG. 13, or they may be displaced outwardly, as desired. The advantage of having a brackets located adjacent the inner edge of the dual rim is that the length of the bolt fastener 12 may be shortened. On the other hand, by locating the brackets toward the outer edge of the dual rim, the angle of inclination of the shaft of the bolt fastener is reduced for a given angular displacement between an attaching location or eye-nut on the tractor wheel and a bracket.

Having thus described in detail a number of embodiments of the present invention, persons skilled in the art will be able to make still further modifications of the structure which has been illustrated and to substitute equivalent elements for those disclosed while continuing to practice the principle of the invention; and it is, therefore, intended that all such modifications and substitutions be covered as they are embraced within the spirit and scope of the appended claims.

I claim:

1. In apparatus for securing a rim of a dual wheel to a rim of a tractor wheel, the improvement comprising: a plurality of attaching means spaced about said tractor wheel; a plurality of generally U-shaped bracket means fixed to the interior of said dual wheel, each bracket providing a curved bearing surface, said bracket means being spaced at different angular intervals than the angular spacing of said attaching means, each bracket further defining a generally T-shaped slot including a base portion communicating through an edge of said curved bearing surface and a laterally elongated portion communicating with said base slot portion; a plurality of fastener means for securing associated ones of said attaching means and said bracket means, some of said attaching means being offset clockwise relative to said bracket means and some of said attaching means being offset counterclockwise relative to their associated bracket means; and a plurality of adjustment means, one for each fastener means, each adjustment means including a first adjusting member having a bearing surface curved to permit adjustment to achieve offset alignment, said curved surface of said first adjusting member engaging said curved bearing surface of an associated bracket means, a second adjusting member having a curved surface for permitting adjustment of said fastener in a radial direction of said tractor wheel, said curved surfaces of said first and second adjusting members facing opposite directions.

2. The apparatus of claim 1 further comprising means for coupling said first and second adjusting members together to prevent relative rotation between them.

3. The apparatus of claim 1 wherein said brackets are fixed to the rim of said dual wheel spaced inwardly adjacent said tractor wheel.

4. The apparatus of claim 1 wherein said brackets are fixed to the rim of said dual wheel spaced outwardly away from said tractor wheel.

5. In apparatus for securing a rim of a dual wheel to a rim of a tractor wheel, the combination comprising: a plurality of attaching means secured to and angularly spaced about said tractor wheel; a plurality of generally U-shaped bracket means fixed to the interior surface of said dual rim, each bracket means including a center wall defining a curved bearing surface and first and second support walls extending outwardly of said center wall and toward said tractor wheel when said dual wheel is assembled thereto, said bracket means being spaced about said dual rim at different angular spacings than said attaching means are spaced about said tractor wheel rim, each of said bracket means including a T-shaped slot including an elongated transverse portion for receiving an associated fastener and a base portion extending upwardly thereof through said center wall; a plurality of fastener means for securing associated ones of said attaching means and said bracket means, each of said fastener means comprising a hook adapted to couple to an associated eye-nut, an elongated shaft extending from said hook for being received in an associated slot of a bracket means, and a nut threadedly received on the distal end of said shaft, some of said attaching means being offset clockwise relative to associated ones of said bracket means, and some of said attaching means being offset counterclockwise relative to their associated bracket means; and a plurality of adjustment means, one for each bracket means to which is secured an offset fastener means, said adjusting means permitting offset alignment of said fastener means relative to a line parallel to the axis of the tractor drive axle and comprising a first member having a cross section of general D shape and including a curved bearing surface engaging the bearing surface of an associated bracket means in assembled relation and defining a tapered aperture for receiving an associated fastener means, and a second D-shaped adjusting member interposed between said nut and said first adjusting member and coupled to said first adjusting member to prevent relative rotation therebetween, said second adjusting member further defining a surface curved about a line transverse of the line of curvature of said first adjusting member to permit said fastener means to be adjusted radially of said tractor wheel to accommodate the same to different spacings of said eye-nuts on said tractor wheel.

* * * * *